United States Patent
Thyagarajan et al.

(10) Patent No.: US 10,248,703 B2
(45) Date of Patent: Apr. 2, 2019

(54) SYSTEM AND METHOD FOR CLUSTER-WIDE REPLICATION OF EMBEDDED COMPONENT CONFIGURATION

(71) Applicant: ORACLE INTERNATIONAL CORPORATION, Redwood Shores, CA (US)

(72) Inventors: Sivakumar Thyagarajan, Karnataka (IN); Sanjeeb Kumar Sahoo, Karnataka (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 462 days.

(21) Appl. No.: 14/150,644

(22) Filed: Jan. 8, 2014

(65) Prior Publication Data

US 2015/0193515 A1   Jul. 9, 2015

(51) Int. Cl.
*G06F 17/30* (2006.01)
*H04L 12/24* (2006.01)

(52) U.S. Cl.
CPC .... *G06F 17/30575* (2013.01); *H04L 41/0879* (2013.01); *H04L 41/0889* (2013.01); *H04L 41/0803* (2013.01)

(58) Field of Classification Search
CPC ............ G06F 17/30575; H04L 41/0803
See application file for complete search history.

(56) References Cited

U.S. PATENT DOCUMENTS

| 5,822,531 A | 10/1998 | Gorczyca |
| 6,192,483 B1 | 2/2001 | Moiin |

(Continued)

FOREIGN PATENT DOCUMENTS

| CN | 102656565 | 8/2012 |
| KR | 1159322 | 6/2012 |

(Continued)

OTHER PUBLICATIONS

Clarkware Consulting, JDepend, 2009, clarkware.com, http://clarkware.com/software/JDepend.html.*

(Continued)

*Primary Examiner* — Austin Hicks
(74) *Attorney, Agent, or Firm* — Tucker Ellis LLP

(57) ABSTRACT

A system and method for cluster-wide replication of embedded component configuration. In accordance with an embodiment, the system comprises an application server acting as a host and including one or more embedded components. When the configuration of an embedded component is modified from its original configuration, a configuration replication logic and deployment interface determines one or more appropriate configuration commands which, if executed at a target application server instance, for example, at another application server instance within a cluster, would result in an equivalent change in the state of an embedded component at that instance. The configuration commands are packaged within a configuration archive as one or more command payloads, which are distributed to target instances, and invoked on an embedded component thereon, to synchronize the configuration of the embedded components at the target instances with that of the host.

20 Claims, 10 Drawing Sheets

(56) References Cited

U.S. PATENT DOCUMENTS

| | | |
|---|---|---|
| 7,010,617 B2 | 3/2006 | Kampe |
| 7,080,371 B1 | 7/2006 | Arnaiz |
| 7,506,335 B1 | 3/2009 | Wooff |
| 7,650,397 B2 | 1/2010 | Price |
| 8,086,706 B2 | 12/2011 | Schlansker |
| 2004/0073782 A1* | 4/2004 | Price .................... G06F 9/4862 713/1 |
| 2011/0099420 A1 | 4/2011 | MacDonald |
| 2013/0232068 A1* | 9/2013 | Leyva .................. G06Q 20/027 705/44 |

FOREIGN PATENT DOCUMENTS

| | | |
|---|---|---|
| TW | 406240 | 9/2000 |
| WO | 2003073206 | 3/2004 |

OTHER PUBLICATIONS

Sun Microsystems, Interface Unmarshaller, 2007, Sun Microsystems, https://docs.oracle.com/javaee/5/api/javax/xml/bind/Unmarshaller.html.*

Schneider, Replication Management Using the State Machine Approach, Chapter 7, ACM Computing Surveys 22, Dec. 1990, 31 pages.

Bea, Bea Weblogic Server, Deploying Weblogic Server Applications, Version 8.1, Aug. 10, 2006, 84 pages.

Ongaro, et al., In Search of an Understandable Consensus Algorithm, Oct. 7, 2013, 17 pages.

Schneider, Implementing Fault-Tolerant Services Using the State Machine Approach: A Tutorial, 1990, pp. 299-319.

* cited by examiner

SYSTEM AND METHOD FOR CLUSTER-WIDE REPLICATION OF EMBEDDED COMPONENT CONFIGURATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and embedded components, and are particularly related to systems and methods for cluster-wide replication of embedded component configuration.

BACKGROUND

The Java Platform Enterprise Edition (Java EE) provides an industry-standard specification by which Java software applications can be developed for use within an enterprise environment. Such software applications can then be run in an appropriate application server, for example, an Oracle WebLogic Server.

Application servers which conform to the Java EE specification are generally designed to be extensible, by providing interfaces that allow for embedding of third-party components. Embedded components benefit from the infrastructure provided by the application server, for example its clustering, transaction, and security support. Such embedded components can be used to augment the capabilities of the application server with additional functionality and services, such as portals, business process management, and cloud support.

Technologies such as OSGi also enable third-party components to be integrated into the application server environment in a modular fashion.

A typical enterprise environment supports clustering of a plurality of application server instances, which can then be managed as a logical domain. Preferably, the configuration of embedded components should be similar among all clustered instances within a domain. This allows the functionality and services provided by the embedded components to be distributed throughout the cluster, which in turn enables fault-tolerance and improved throughput.

However, in some application server environments, an embedded component may be required to use its host's proprietary configuration synchronization interface to replicate its configuration to other clustered instances. This creates lock-in of the embedded component implementation with its host application server. In other environments, the host application server may not provide interfaces for synchronization of configuration across its clustered instances, in which cases an embedded component developer is forced to either use a proprietary interface, or not support clustering. These are generally the types of environment in which embodiments of the invention can be used.

SUMMARY

Described herein is a system and method for cluster-wide replication of embedded component configuration. In accordance with an embodiment, the system comprises an application server acting as a host and including one or more embedded components. When the configuration of an embedded component is modified from its original configuration, a configuration replication logic and deployment interface determines one or more appropriate configuration commands which, if executed at a target application server instance, for example, at another application server instance within a cluster, would result in an equivalent change in the state of an embedded component at that instance. The configuration commands are packaged within a configuration archive as one or more command payloads, which are distributed to target instances, and invoked on an embedded component thereon, to synchronize the configuration of the embedded components at the target instances with that of the host.

DETAILED DESCRIPTION

Figure 1:
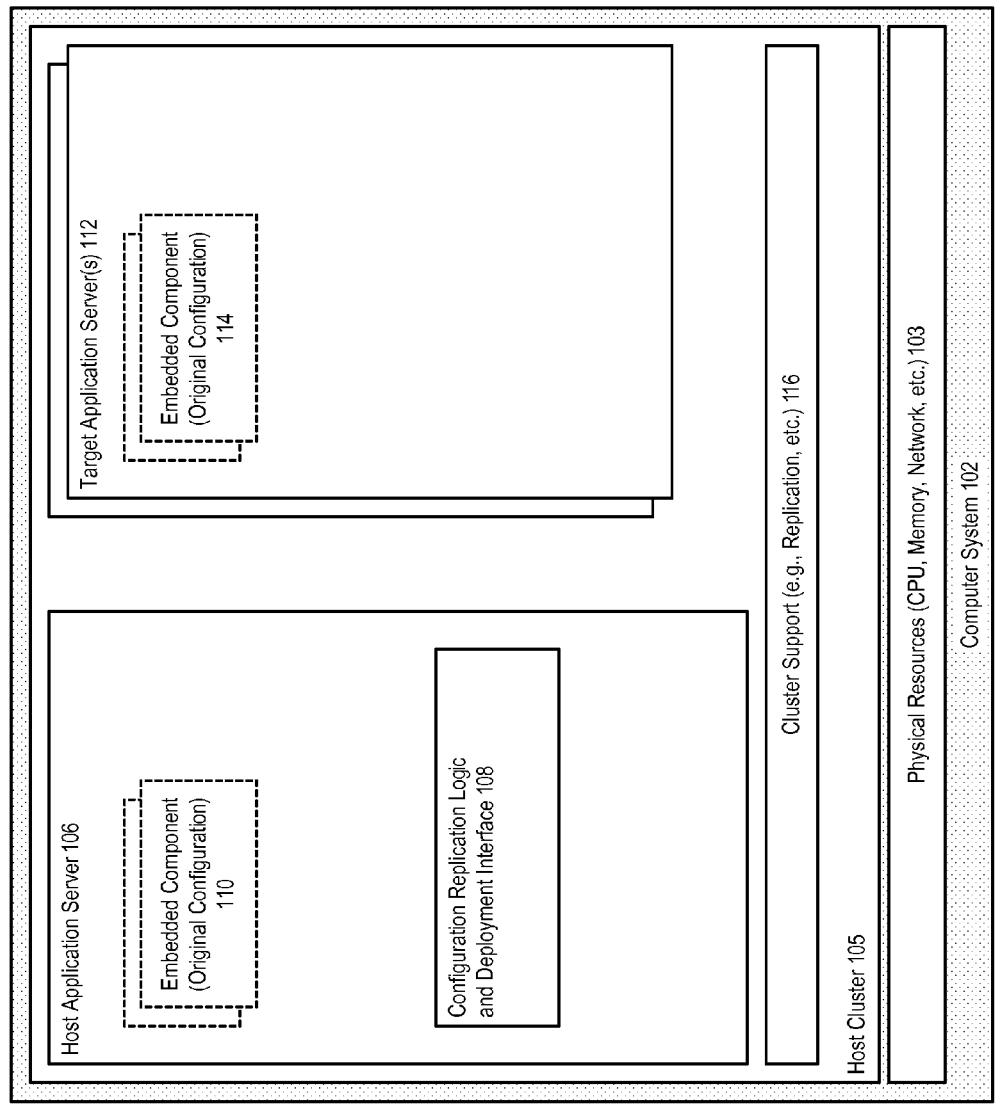
FIG. 1 illustrates a system for cluster-wide replication of embedded component configuration in accordance with an embodiment.
Figure 1:
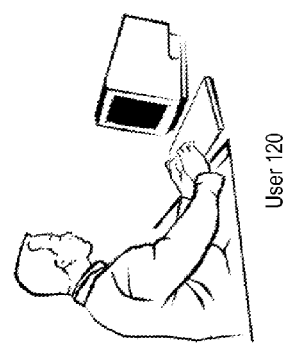

As described above, the Java Platform Enterprise Edition (Java EE) provides an industry-standard specification by which Java software applications can be developed for use within an enterprise environment.

Application servers which conform to the Java EE specification are generally designed to be extensible, by providing interfaces that allow for embedding of third-party components. In an enterprise environment which supports clustering of a plurality of application server instances, the configuration of embedded components should preferably be similar among all clustered instances within a domain.

However, in some application server environments, use of a host's proprietary configuration synchronization interface creates lock-in of the embedded component implementation with its host application server; while in other environments, the host application server may not provide interfaces for synchronization of configuration across its clustered instances.

In accordance with an embodiment, described herein is a system and method for cluster-wide replication of embedded component configuration.

In accordance with an embodiment, the system comprises an application server acting as a host and including one or more embedded components. When the configuration of an embedded component is modified from its original configuration, a configuration replication logic and deployment interface determines one or more appropriate configuration commands which, if executed at a target application server instance, for example, at another application server instance within a cluster, would result in an equivalent change in the state of an embedded component at that instance. The configuration commands are packaged within a configuration archive as one or more command payloads, which are distributed to target instances, and invoked on an embedded component thereon, to synchronize the configuration of the embedded components at the target instances with that of the host.

In accordance with an embodiment, the configuration of an embedded component housed within a host application server's Java EE runtime can be replicated to one or more other clustered Java EE runtime instances, without relying on the host's runtime configuration synchronization mechanism.

For example, in accordance with an embodiment, the configuration information can be replicated by piggybacking on the host's application deployment synchronization functionality.

In this manner, embodiments of the system can provide a generic means of replicating configuration information between clustered application server instances in a domain, which can work portably with different types of application servers, including different types of Java EE application servers.

In accordance with an embodiment, the cluster-wide replication of embedded component configurations can include or support the following features:

Creation of Command Payload: in accordance with an embodiment, when a particular embedded component at a host application server instance is reconfigured or its configuration state is otherwise modified, the system can externalize the configuration changes that must be replicated in that particular embedded component as self-contained configuration commands. The configuration commands can then be packaged as command payloads within a configuration archive, for example as one or more portable web application archive (WAR) payloads, for distribution to other server instances.

Replication of Commands through Deployment: in accordance with an embodiment, the command payloads packaged as configuration archives can then be deployed by the host to its cluster. In accordance with an embodiment, the deployment of the payload can be automatically executed on clustered target instances by the application server's deployment synchronization functionality. For example, in accordance with an embodiment, the system can use a Java EE application server's container support for portable web archives to replicate WARs to other instances in the cluster. Since, in this example, the only interface between the embedded component and its host is the WAR deployment interface, the approach can be portably used across different types of Java EE application servers.

Utilization of Clustering Support of Host: in accordance with an embodiment, since the embedded component can synchronize its configuration by piggybacking on the host's clustering support, the embedded component need not itself be aware of underlying complex clustering details, such as the number of clustered nodes, the number of active non-faulty replicas, replica coordination protocols, or state replication techniques.

Handling of Cluster Reconfiguration and Offline Nodes: in accordance with an embodiment, the host's application deployment synchronization functionality can also be responsible for automatic handling of cluster reconfigurations, including handling the synchronization of embedded component configuration state to clustered instances that come online later.

Agreement and Ordering: in accordance with an embodiment, replicated coordination of embedded component configuration requires that non-faulty replicas receive and process the same sequence of configuration change requests. In accordance with an embodiment, the system can use the application deployment ordering functionality of the host to ensure that configuration replication is performed in proper causal order. The application server's application deployment functionality ensures agreement by synchronizing each application deployment to cluster instances.

Safety: in accordance with an embodiment, the system can recognize the use of an administration or master server as a host server, and can be implemented such that only committed configuration commands within a host that is identified as the administration or master server are pushed to clustered instances.

Command Logging: in accordance with an embodiment, by modeling the configuration changes as commands, a command log can be created, which indicates the list of payload applications deployed in the host server and the clustered instances, acts as a history of configuration changes, and can be used for backup, audit, or other purposes.

Passive Replication: in accordance with an embodiment, the system can enable portable implementation of a passive replication of configuration in a single master/multiple secondaries scenario.

FIG. 1 illustrates a system for cluster-wide replication of embedded component configuration in accordance with an embodiment.

As shown in FIG. 1, in accordance with an embodiment, a computer system 102 can include physical resources 103, such as a processor (CPU), memory, and network resources. The system can be used to provide an enterprise environment which supports clusters of application server instances, which can then be managed as logical domains.

In accordance with an embodiment, a host cluster 105 can include a host application server 106, for example a WebLogic server, with a configuration replication logic and deployment interface 108, and one or more embedded components 110 having an original configuration. The embedded components benefit from the infrastructure provided by the application server, such as clustering, transaction, and security support; and can be used to augment the capabilities of the application server with additional functionality and services, such as portals, business process management, or cloud support.

As further shown in FIG. 1, in accordance with an embodiment, the host cluster can include additional functionality and services, such as cluster support for replication 116.

For example, a Java EE application server's application deployment synchronization functionality can include container support for portable web archives, which replicates WARs deployed to a host instance to other instances 112 within the cluster. Each of the other clustered instances can similarly include one or more embedded components 114 having an original configuration.

As further shown in FIG. 1, in accordance with an embodiment, the system allows users 120, such as system administrators, to interact with the system, including modifying the configuration of embedded components at one or more of the clustered instances.

Figure 2:
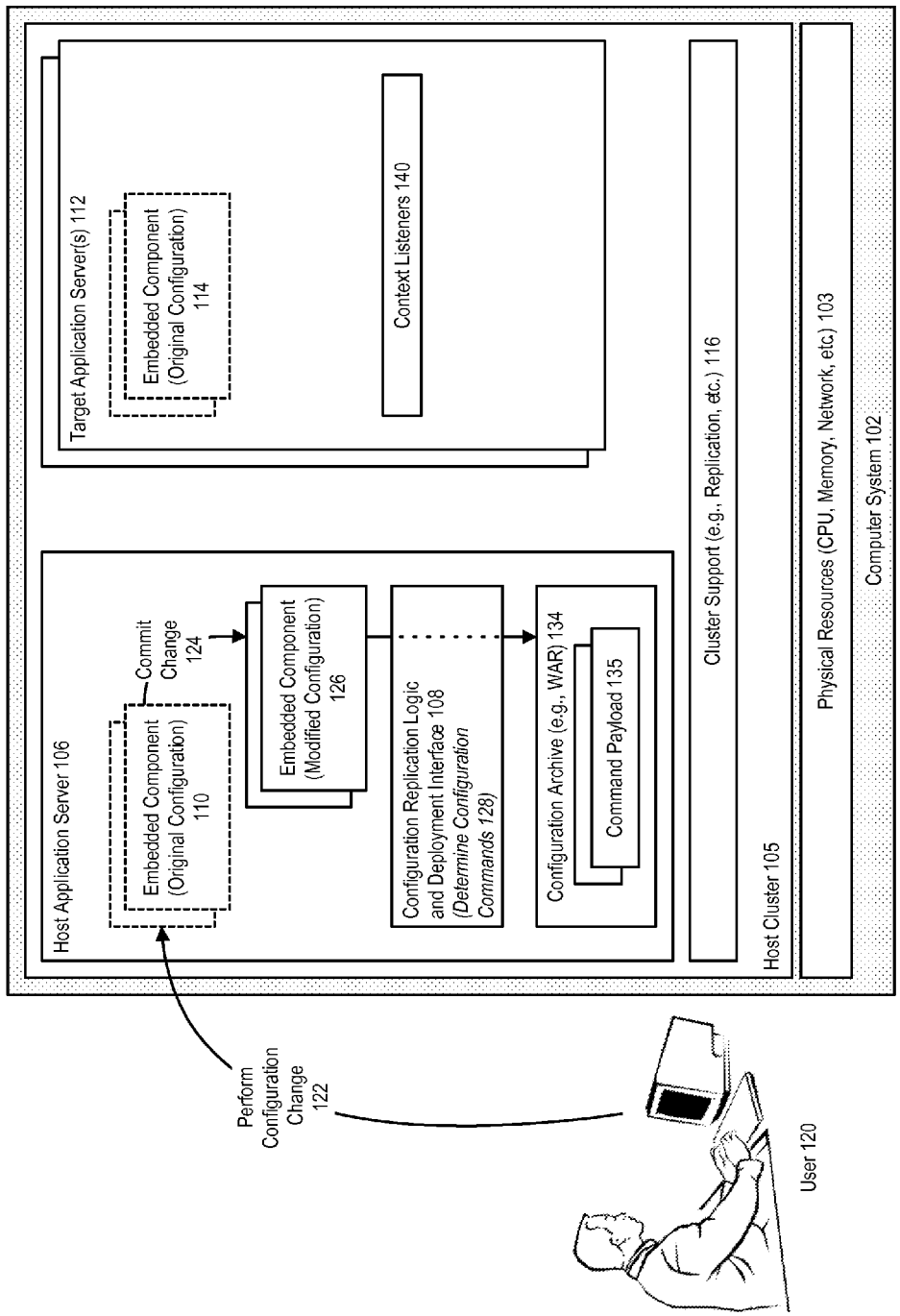
FIG. 2 further illustrates a system for cluster-wide replication of embedded component configuration, in accordance with an embodiment.

FIG. 2 further illustrates a system for cluster-wide replication of embedded component configuration in accordance with an embodiment. As shown in FIG. 2, the user can perform a configuration change 122 at the host's embedded component, to create 124 a modified configuration 126 for that embedded component. The configuration replication logic and deployment interface determines appropriate configuration commands 128, and packages the commands within a configuration archive, such as a Web archive (WAR) file 134, as one or more command payloads 135.

As further shown in FIG. 2, the target application servers can include a context listener 140 or similar mechanism that listens for or otherwise receives the command payloads.

Figure 3:
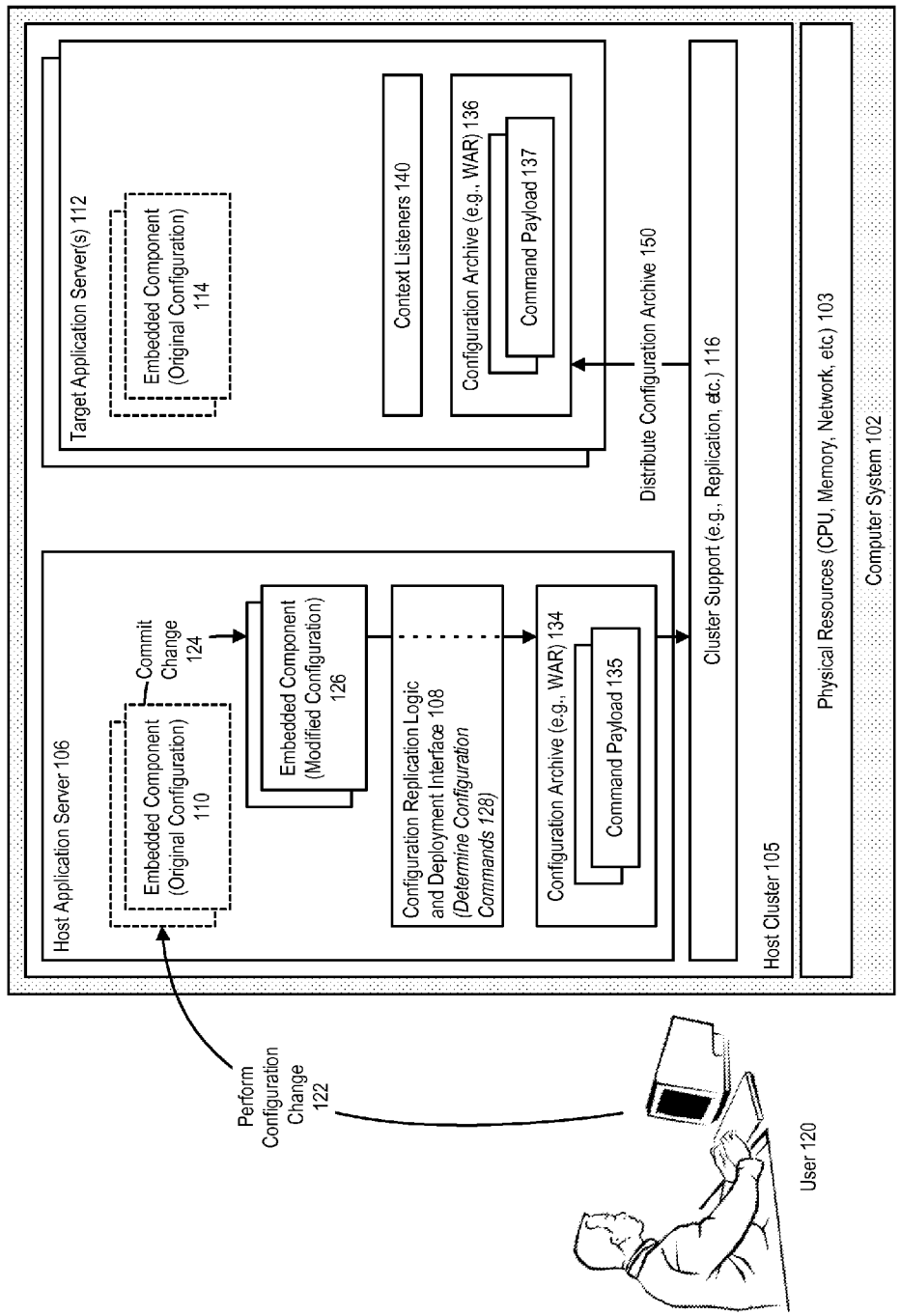
FIG. 3 further illustrates a system for cluster-wide replication of embedded component configuration, in accordance with an embodiment.

FIG. 3 further illustrates a system for cluster-wide replication of embedded component configuration in accordance with an embodiment. As shown in FIG. 3, the configuration archive, e.g., WAR file with its command payloads (indicated as 136, 137) are distributed 150 to the target application server.

Figure 4:
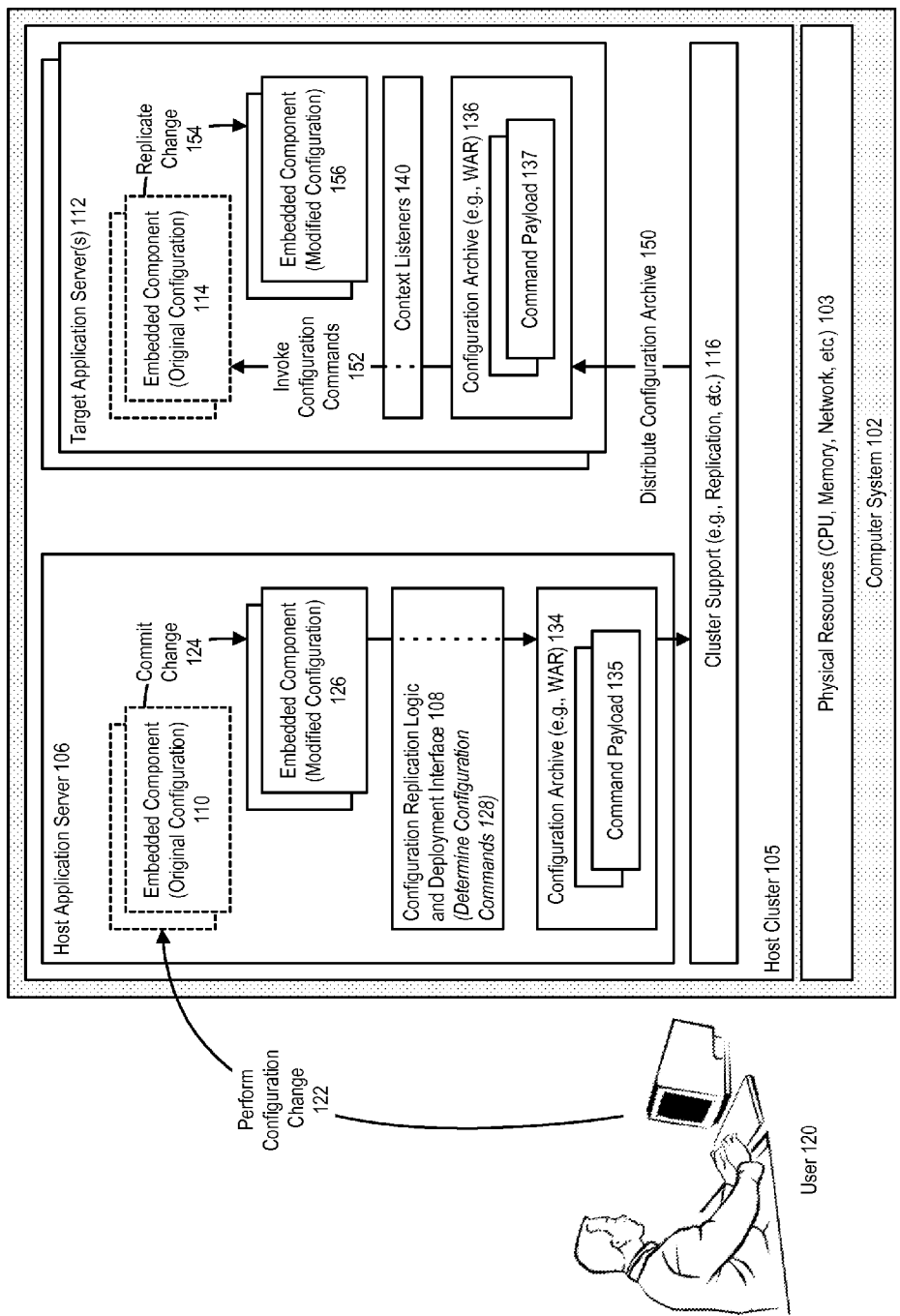
FIG. 4 further illustrates a system for cluster-wide replication of embedded component configuration, in accordance with an embodiment.

FIG. 4 further illustrates a system for cluster-wide replication of embedded component configuration in accordance with an embodiment. As shown in FIG. 4, the command payloads in the configuration archive, e.g., WAR file, are invoked 152 on the one or more embedded components having an original configuration, to replicate the changes from the host 154, and to modify 156 the configuration of the embedded components at the target application server, to be synchronized with those at the host.

Example Usage

Figure 5:
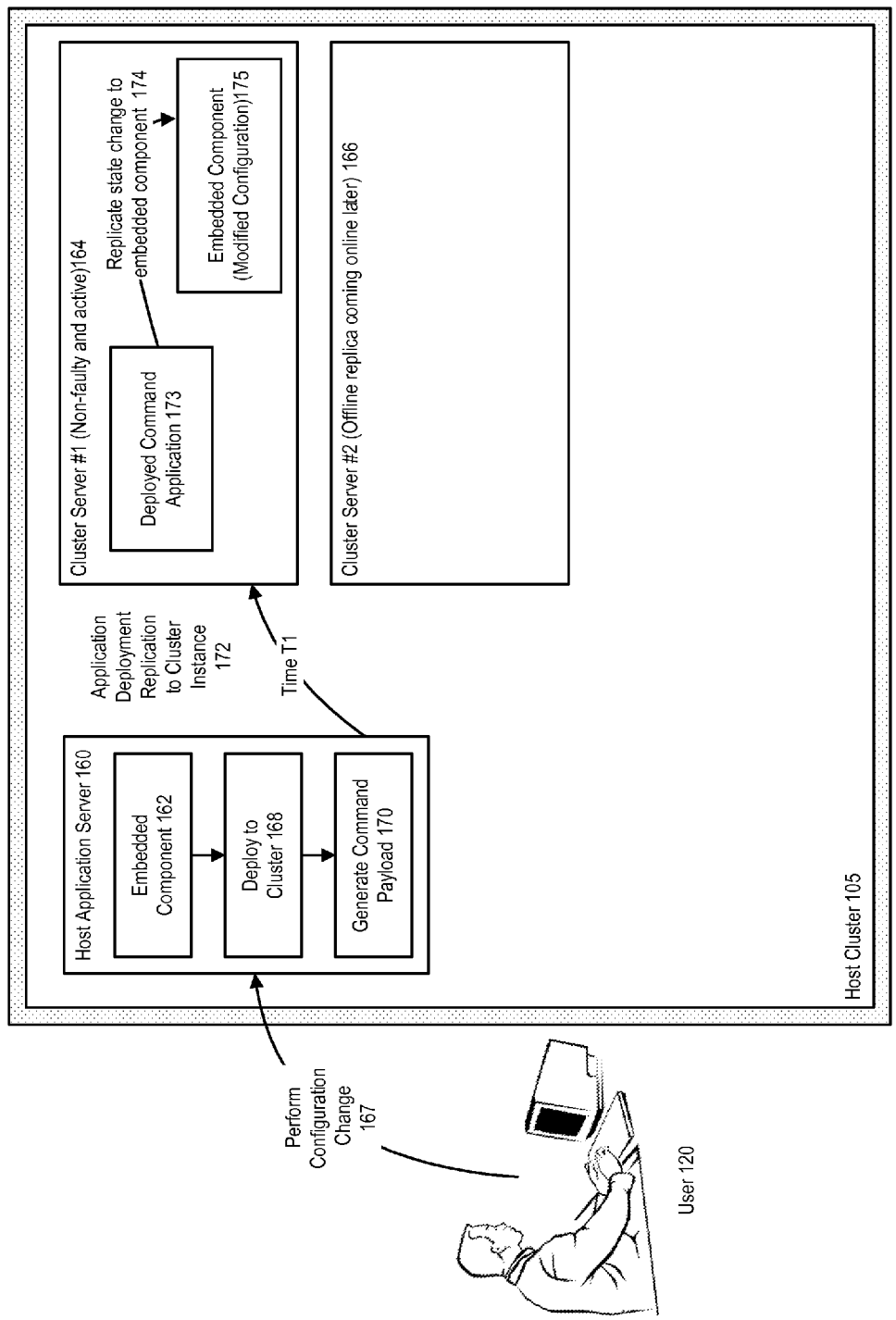
FIG. 5 illustrates an example usage of a system for cluster-wide replication of embedded component configuration, in accordance with an embodiment.

FIG. 5 illustrates an example usage of a system for cluster-wide replication of embedded component configuration, in accordance with an embodiment.

As shown in FIG. 5, in accordance with an embodiment, a host application server 160 can include an embedded component 162, as described previously. In order to replicate a committed configuration state change 167 in the host (administration, master) server to clustered instances, the state change can be modeled as a configuration command that is then deployed 168, 170, and replicated to the clustered instance. Execution of the command on the clustered instance results in an equivalent change in the configuration state of the clustered instance and results in its state being synchronized with that of the master.

In accordance with an embodiment, the configuration command can be packaged 172 as a payload in a configuration archive, such as a WAR. The WAR bundles the appropriate framework libraries needed to run the command in the clustered instance upon deployment.

The WAR can then be deployed 173 by the embedded component to the host's cluster using the host's application deployment synchronization functionality.

The host application server then distributes 174 the WAR application deployment to all clustered instances in the domain, to modify the configuration of the embedded component 175, to be synchronized with that at the host.

In accordance with an embodiment, if a clustered instance in the cluster is active (e.g., a non-faulty replica) 164 then, when the WAR is deployed in the clustered instance, the bootstrapping logic in the framework library automatically invokes the configuration command in the clustered instance. Successful invocation of the command in a clustered instance results in the configuration state change that had occurred in the master, and thus the successful replication of the state or configuration of the embedded component from the master to the replica. Successful deployment of a command application also results in durable application of the configuration updates that has occurred in the master.

Figure 6:
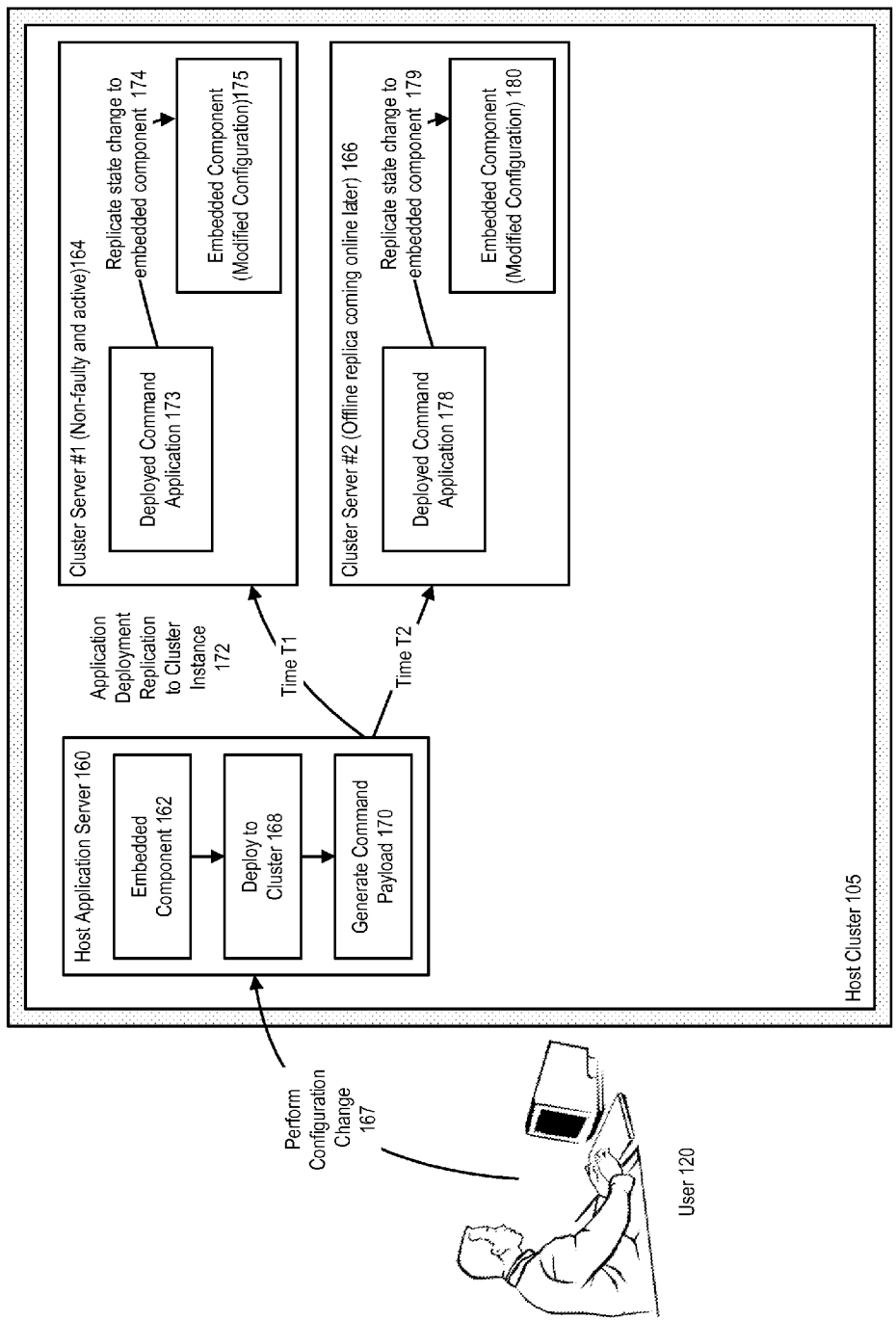
FIG. 6 further illustrates an example usage, in accordance with an embodiment.

FIG. 6 further illustrates an example usage, in accordance with an embodiment. As shown in FIG. 6, in accordance with an embodiment, if a clustered instance in the cluster is offline, and comes back later (e.g., offline replicas) 166, then the application server's application deployment infrastructure distributes 178 the payload application to the cluster and the command execution would then proceed 179, 180 as described above.

Figure 7:
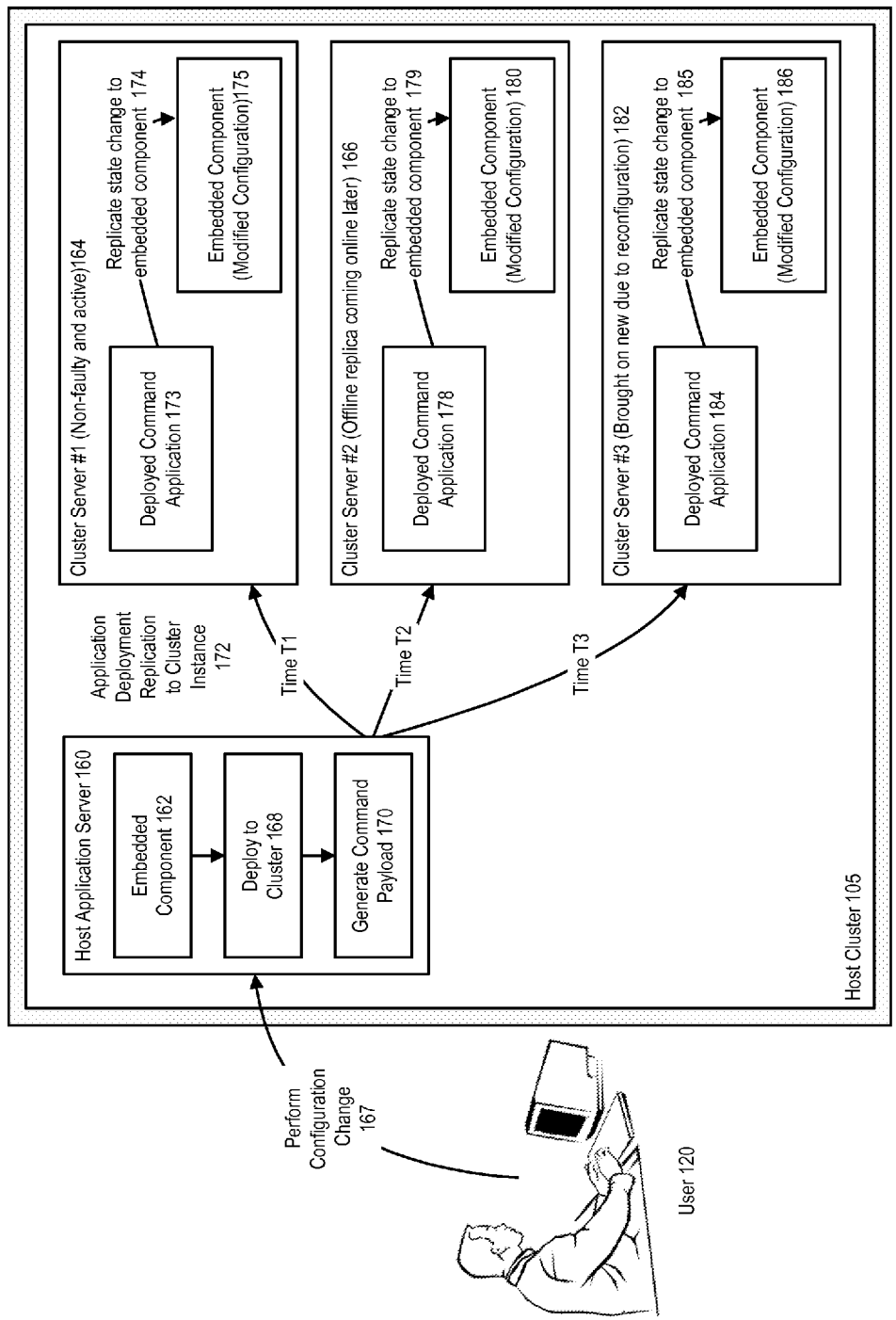
FIG. 7 further illustrates an example usage, in accordance with an embodiment.

FIG. 7 further illustrates an example usage, in accordance with an embodiment. As shown in FIG. 7, in accordance with an embodiment, if the cluster undergoes a shape-change after the configuration state change has been replicated (e.g., reconfiguration) 182, then the application server's deployment infrastructure ensures that all applications deployed to the cluster are distributed 184 to a new instance added to the cluster, and the command execution would similarly then proceed 185, 186 as described above.

Example Implementation

Figure 8:
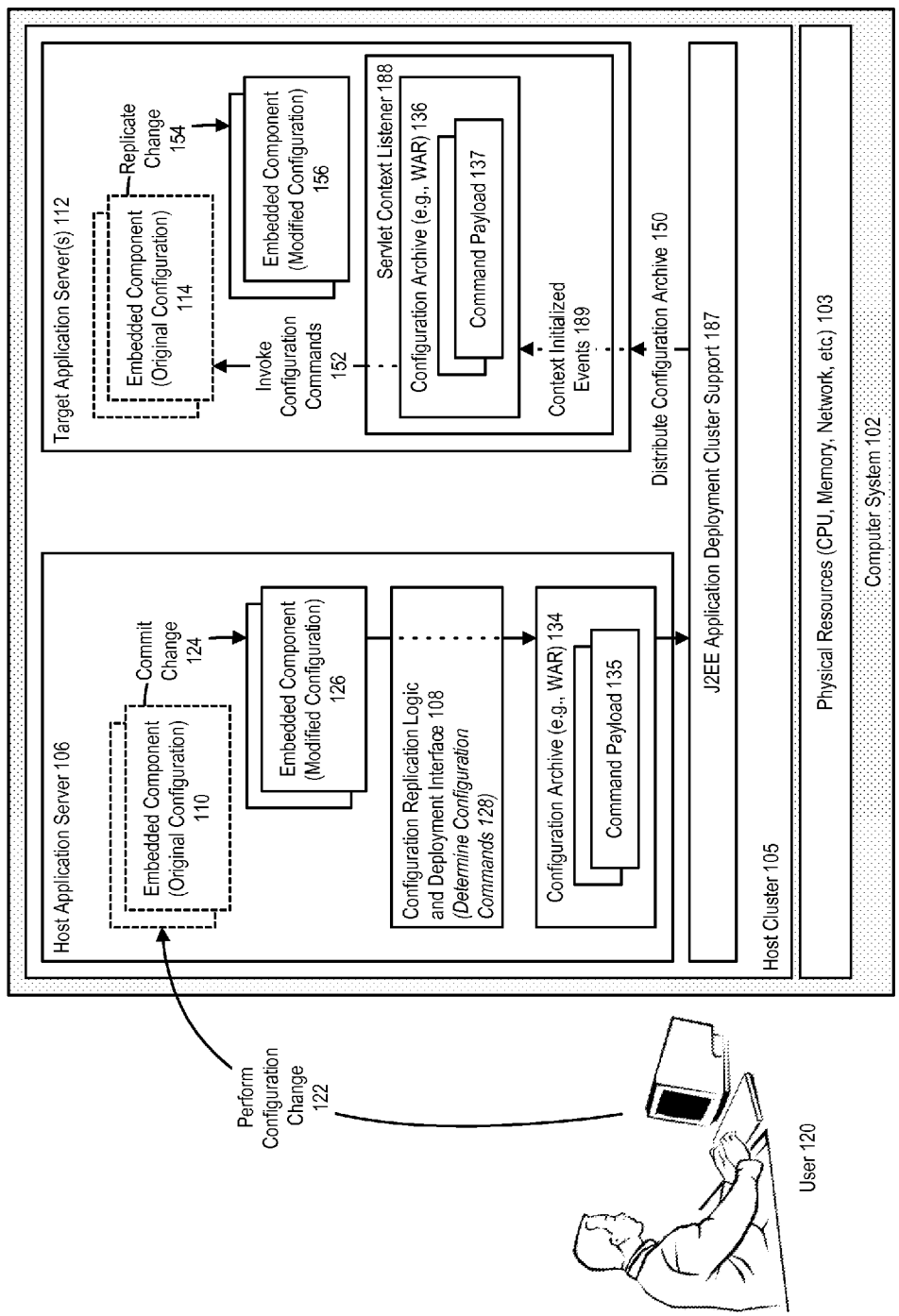
FIG. 8 illustrates an example implementation of a system for cluster-wide replication of embedded component configuration, in accordance with an embodiment.

FIG. 8 illustrates an example implementation of a system for cluster-wide replication of embedded component configuration, in accordance with an embodiment.

As shown in FIG. 8, in accordance with an embodiment, the system can leverage, for example, a WebLogic application server's Java EE application deployment cluster support 188, together with a servlet context listener 188 that listens to context initialized events 189, to determine the deployment of an application to a clustered instance.

In accordance with an embodiment, a configuration command can be modeled, e.g., as a command line interface (CLI) command. The payload can be a self-containing, e.g., WAR file, and can contain all the dependencies of the source CLI command. For example, if the configuration change in the host administration server requires additional information to effect the change, such as command parameters, or file inputs, then these dependencies can be included as part of the payload, within the WAR.

In accordance with an embodiment, the application server's framework libraries can include a servlet context listener (ServletContextListener) that listens to context initialized (contextInitialized) events, to determine the deployment of an application to a clustered instance. The servlet context listener implementation can unmarshal or otherwise extract dependencies in the payload, and execute the stuffed configuration commands in the clustered instance's embedded component. The successful execution of the command in the clustered instance results in the same configuration state change that occurred in the master, to occur in the secondary.

In accordance with an embodiment, configuration commands may not be commuted, and hence their order constraints cannot be relaxed. To address this, in accordance with an embodiment, since, e.g., WebLogic loads software applications in alphabetical order within the same load order, payload applications can be generated in alphabetically increasing order by appending the server time of the administration server in the end of the generated application WAR name. This ensures that command applications are loaded in the clustered instance in the same order they were executed in the administration server. This execution order is also retained when offline nodes come back online later, for example when missed configuration updates are applied on the new node; or when a new clustered node is added, for example through cluster reconfiguration.

In accordance with an embodiment, the system can recognize the use of an administration or master server as a host server, and can be implemented such that only committed configuration commands within a host that is identified as the administration or master server are pushed to clustered instances. In such embodiments, replication can be restricted to administration severs. Since only commands that had been committed in the master are replicated to secondaries, the replication approach is considered safe.

The details of an exemplary embodiment described above are provided by way of illustration. In accordance with other embodiments, other implementations can be provided, for use with other types of embedded components or application servers.

Replication Methods

Figure 9:
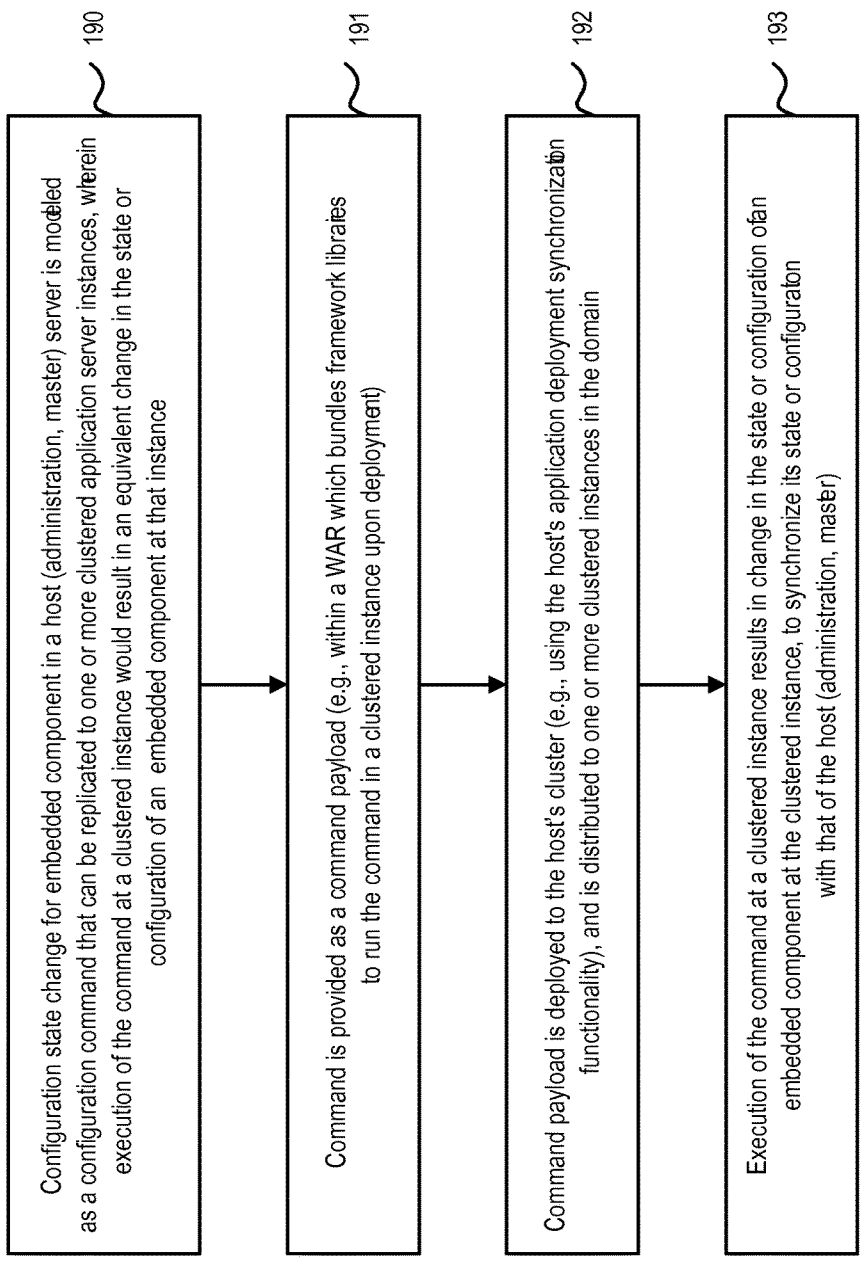
FIG. 9 illustrates a method for providing cluster-wide replication of embedded component configuration, in accordance with an embodiment.

FIG. 9 illustrates a method for providing cluster-wide replication of embedded component configuration, in accordance with an embodiment.

As shown in FIG. 9, at step 190, a configuration state change for an embedded component in a host (administration, master) server is modeled as a configuration command that can be replicated to one or more clustered application server instances, wherein execution of the command at a clustered instance would result in an equivalent change in the state or configuration of an embedded component at that instance.

At step 191, the command is provided as a command payload, for example within a WAR which bundles framework libraries to run the command in a clustered instance upon deployment.

At step 192, the command payload is deployed to the host's cluster, for example using the host's application deployment synchronization functionality, and is distributed to one or more clustered instances in the domain.

At step 193, execution of the command at a clustered instance results in a change in the state or configuration of an embedded component at the clustered instance, to synchronize its state or configuration with that of the master.

Figure 10:
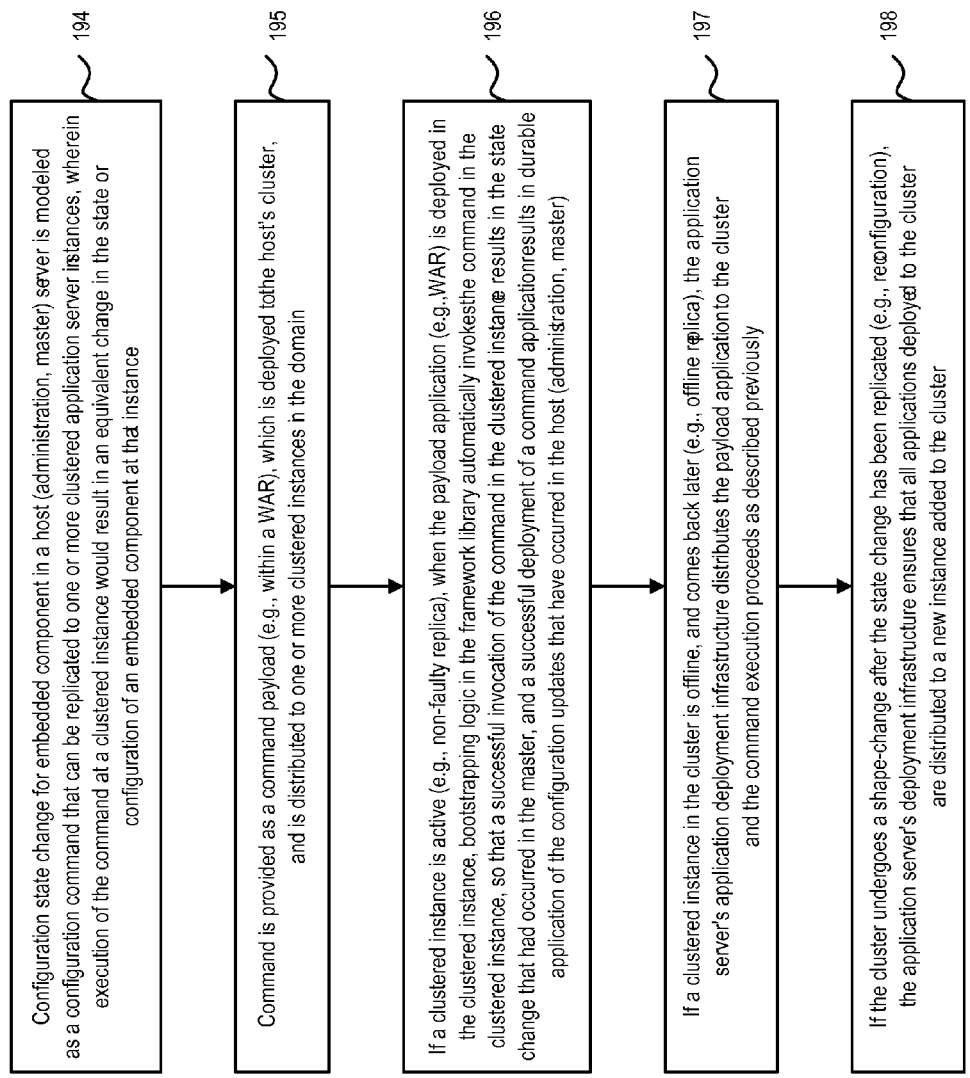
FIG. 10 illustrates another method for providing cluster-wide replication of embedded component configuration, in accordance with an embodiment.

FIG. 10 illustrates another method for providing cluster-wide replication of embedded component configuration, in accordance with an embodiment.

As shown in FIG. 10, at step 194, a configuration state change for embedded component in a host (administration, master) server is modeled as a configuration command that can be replicated to one or more clustered application server instances, wherein execution of the command at a clustered instance would result in an equivalent change in the state or configuration of an embedded component at that instance.

At step 195, the command is provided as a command payload, for example within a WAR, which is deployed to the host's cluster and is distributed to one or more clustered instances in the domain.

At step 196, if a clustered instance is active, for example a non-faulty replica, when the payload application (e.g., WAR) is deployed in the clustered instance, bootstrapping logic in the framework library can automatically invoke the command in the clustered instance, so that a successful invocation of the command in the clustered instance results in the state change that had occurred in the master, and a successful deployment of a command application results in durable application of the configuration updates that have occurred in the master.

At step 197, if a clustered instance in the cluster is offline, and comes back later, for example an offline replica, the application server's application deployment infrastructure can distribute the payload application to the cluster and the command execution can then proceed as described previously.

At step 198, if the cluster undergoes a shape-change after the state change has been replicated, for example a reconfiguration, the application server's deployment infrastructure ensures that all applications deployed to the cluster are distributed to a new instance added to the cluster.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, although the examples described above generally describe the use of Java EE application servers, and WAR archive files, in accordance with other embodiments other types of application servers and configuration archives can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for cluster-wide replication of embedded component configuration, comprising:
   a computer including a processor;
   a host application server that includes a configuration replication logic and deployment interface, and one or more embedded components, each embedded component having an original configuration associated therewith;
   wherein the system receives input to modify the original configuration of a particular embedded component provided at the host application server, and cause a configuration state change for the particular embedded component at the host application server;

wherein, at the host application server, the configuration replication logic and deployment interface:
  determines, in response to the changed configuration state of the particular embedded component, one or more configuration commands to be executed at a target application server having the particular embedded component, to provide an equivalent change in configuration of the particular embedded component at the target application server, and
  packages, within a configuration archive, each of the one or more configuration commands as a command payload, associates the command payloads with an order in which the commands were executed at the host application server, and distributes the configuration archive including the command payloads to the target application server; and
wherein, at the target application server, a listener, upon receipt and deployment of the configuration archive:
  extracts the command payloads, and
  invokes the associated configuration commands on the particular embedded component at the target application server, in the order the commands were executed at the host server, to modify the configuration of the particular embedded component at the target application server.

2. The system of claim 1, wherein the configuration archive is a web archive (WAR) file.

3. The system of claim 1, wherein the configuration archive bundles framework libraries needed to invoke the one or more command payloads in a clustered instance upon deployment.

4. The system of claim 1, wherein the configuration archive is deployed to a cluster that includes the host application server using an application deployment synchronization functionality provided by the host application server.

5. The system of claim 1, wherein the listener unmarshals and extracts dependencies in the command payloads, and executes the commands in the clustered target application server instance's embedded component.

6. The system of claim 1, wherein the system includes a cluster having a plurality of nodes, whereupon a particular node being made available within the cluster, the one or more command payloads are invoked at the particular node according to the order that reflects modifications to the original configuration at the host server.

7. The system of claim 1, wherein the one or more command payloads are generated in an alphabetically increasing order by appending a server time to the configuration archive name.

8. The system of claim 1, wherein the listener listens to context initialized events, to determine the deployment of the configuration archive at the target application server.

9. The system of claim 1, wherein the listener is a servlet context listener that receives the one or more command payloads, upon deployment of the configuration archive to the target application server.

10. A method for cluster-wide replication of embedded component configuration, comprising:
  providing, at a computer including a processor, a host application server that includes a configuration replication logic and deployment interface, and one or more embedded components, each embedded component having an original configuration associated therewith;
  receiving input to modify the original configuration of a particular embedded component provided at the host application server, and cause a configuration state change for the particular embedded component at the host application server;
  at the host application server:
    determining, in response to the changed configuration state of the particular embedded component, one or more configuration commands to be executed at a target application server having the particular embedded component, to provide an equivalent change in configuration of the particular embedded component at the target application server, and
    packaging, within a configuration archive, each of the one or more configuration commands as a command payload, associating the command payloads with an order in which the commands were executed at the host application server, and distributing the configuration archive including the command payloads to the target application server; and
  at the target application server, upon receipt and deployment of the configuration archive:
    extracting, by a listener, the command payloads, and
    invoking the associated configuration commands on the particular embedded component at the target application server, in the order the commands were executed at the host server, to modify the configuration of the particular embedded component at the target application server.

11. The method of claim 10, wherein the configuration archive is a web archive (WAR) file.

12. The method of claim 10, wherein the configuration archive bundles framework libraries needed to invoke the one or more command payloads in a clustered instance upon deployment.

13. The method of claim 10, wherein the configuration archive is deployed to a cluster that includes the host application server using an application deployment synchronization functionality provided by the host application server.

14. The method of claim 10, wherein the listener unmarshals and extracts dependencies in the command payloads, and executes the commands in the clustered target application server instance's embedded component.

15. The method of claim 10, wherein the method is performed within a cluster having a plurality of nodes, whereupon a particular node being made available within the cluster, the one or more command payloads are invoked at the particular node according to the order that reflects modifications to the original configuration at the host server.

16. A non-transitory computer readable storage medium including instructions stored thereon which when read and executed by one or more computers cause the computer to perform the method comprising:
  providing a host application server that includes a configuration replication logic and deployment interface, and one or more embedded components, each embedded component having an original configuration associated therewith;
  receiving input to modify the original configuration of a particular embedded component provided at the host application server, and cause a configuration state change for the particular embedded component at the host application server;
  at the host application server:
    determining, in response to the changed configuration state of the particular embedded component, one or more configuration commands to be executed at a target application server having the particular embedded component, to provide an equivalent change in configuration of the particular embedded component at the target application server, and packaging, within a configuration archive, each of the one or more configuration commands as a command payload, associating the command payloads with an order in which the commands were executed at the host application server, and distributing the configuration archive including the command payloads to the target application server; and at the target application server, upon receipt and deployment of the configuration archive:

extracting, by a listener, the command payloads, and invoking the associated configuration commands on the particular embedded component at the target application server, in the order the commands were executed at the host server, to modify the configuration of the particular embedded component at the target application server.

17. The non-transitory computer readable storage medium of claim 16, wherein the configuration archive is a web archive (WAR) file.

18. The non-transitory computer readable storage medium of claim 16, wherein the configuration archive bundles framework libraries needed to invoke the one or more command payloads in a clustered instance upon deployment.

19. The non-transitory computer readable storage medium of claim 16, wherein the configuration archive is deployed to a cluster that includes the host application server using an application deployment synchronization functionality provided by the host application server.

20. The non-transitory computer readable storage medium of claim 16, wherein the listener unmarshals and extracts dependencies in the command payloads, and executes the commands in the clustered target application server instance's embedded component.

* * * * *